(12) United States Patent
Agrawal et al.

(10) Patent No.: US 8,457,426 B1
(45) Date of Patent: Jun. 4, 2013

(54) METHOD AND APPARATUS FOR COMPRESSING A DOCUMENT USING PIXEL VARIATION INFORMATION

(75) Inventors: Ram Bhushan Agrawal, Noida (IN); Amit Kumar Manocha, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 162 days.

(21) Appl. No.: 13/110,386

(22) Filed: May 18, 2011

(51) Int. Cl.
*G06K 9/36* (2006.01)

(52) U.S. Cl.
USPC .......................................................... 382/237

(58) Field of Classification Search
USPC ................. 382/164, 166, 171–173, 176, 199, 382/209, 212–213, 218, 232, 282–283, 302; 348/586; 358/3.07–3.08, 3.27, 464
See application file for complete search history.

(56) References Cited

U.S. PATENT DOCUMENTS

| | | | |
|---|---|---|---|
| 6,731,800 B1 | 5/2004 | Barthel et al. | |
| 7,292,375 B2 | 11/2007 | Nishida | |
| 7,343,046 B2 * | 3/2008 | Curry et al. | 382/243 |
| 7,512,274 B2 | 3/2009 | Simard et al. | |
| 7,894,683 B2 * | 2/2011 | Nagarajan et al. | 382/239 |
| 7,899,258 B2 | 3/2011 | Liu et al. | |
| 8,068,684 B2 * | 11/2011 | Dauw et al. | 382/243 |
| 8,218,908 B2 * | 7/2012 | Ilbery | 382/299 |
| 2009/0067709 A1 | 3/2009 | Gross et al. | |

OTHER PUBLICATIONS

"Smart Compression of Document Images Using MRC", Ram Bhushan Agrawal, Amit Manocha, Adobe Systems Incorporated PowerPoint Presentation, 33 pages, 2010.
"Adaptive Document Binarization", Jaakko Sauvola et al., Machine Vision and Media Processing Group, Infotech Oulu, University of Oulu, Finland, 1997, pp. 147-152.
"A Foreground/Background Separation Algorithm for Image Compression", Patrice Y. Simard et al., Microsoft Research, Redmond, WA, 2004, 10 pages.
"MRC Compression of Compound Documents Using Threshold Segmentation, Iterative Data-filling and H.264/AVC-INTRA", A. Zaghetto, R.L. deQueiroz, and D. Mukherjee, 2008, pp. 679-686.
"Improved Document Image Binarization by Using a Combination of Multiple Binarization Techniques and Adapted Edge Information", B. Gatos, I. Pratikakis, and S.J. Perantonis, Computational Intelligence Laboratory, Institute of Informatics and Telecommunications, National Research Center, Athens, Greece, 2008, 4 pages.

* cited by examiner

*Primary Examiner* — Jose Couso
(74) *Attorney, Agent, or Firm* — Moser Taboada (57) ABSTRACT

A method and apparatus for providing document compression. In some embodiments, the method includes converting a document into a grayscale image, for each gradient component of the grayscale image, creating a monochrome image region, determining pixel variation information for the monochrome image region, and selecting the monochrome image region for a binary mask if the pixel variation information satisfies dynamic threshold data and creating a compressed document using the binary mask.

15 Claims, 5 Drawing Sheets

METHOD AND APPARATUS FOR COMPRESSING A DOCUMENT USING PIXEL VARIATION INFORMATION

BACKGROUND

1. Technical Field

Embodiments of the present application generally relate to document compression and, in particular, a method and apparatus for compressing a document using pixel variation information.

2. Description of the Related Art

The rapid proliferation of multimedia content (i.e., user interactive controls and application generated controls that create an exciting and interesting multimedia experience) throughout the Internet was caused by numerous technological innovations. Users spend a significant amount of time conducting various activities related to multimedia content (e.g., surfing educational websites, viewing detailed product demonstrations, accessing digital libraries and/or the like). These users often generate and/or view multimedia content on various display devices (e.g., a mobile phone, a scanner, an electronic book reader, a Personal Digital Assistant (PDA), a hand-held gaming device and/or the like).

Various types of multimedia content, such as image and text data, may be stored in a document, such as a Portable Document Format (PDF) file. PDF is an open standard for document exchange created by Adobe Systems of San Jose, Calif. Often, the document becomes too large in size for efficient data transmission to another storage area. Such a document is compressed into a document image that is smaller in size and thus, easier to transfer as a file. A well-known compression process is known as Mixed Raster Content (MRC) based document compression where the document is decomposed into three layers: a foreground layer, a background layer and a mask layer. The mask layer (also referred to herein as simply a mask) is a binary image in which each pixel value dictates whether color of a corresponding pixel in the compressed document will be retrieved from the foreground layer or the background layer. MRC compression is typically implemented in a scanner (e.g., a document and/or image scanner), which is a device that creates an electronic version of a paper document.

MRC document compression is used to achieve higher compression ratios when scanning document while retaining textual data clarity. However, one of the main challenges to implementing MRC document compression is creating an appropriate and accurate mask. Having such a mask renders creating the foreground and the background layers to be relatively simple tasks. Conventional methods of mask creation apply a binarization process (e.g., NiBlack binarization) on a grayscale image. Sometimes, MRC document compression does not produce an accurate mask when certain conditions are present, such as light colored text on a light background, dark colored text on a dark background, reverse text (e.g., light text on a dark background), inclusion of image regions in the mask and noise.

Therefore, there is a need in the art for a method and apparatus for compressing a document using pixel variation information to create the accurate mask.

SUMMARY

Various embodiments of the present application generally comprise a method and apparatus for compressing a document using pixel variation information. In some embodiments, a document is converted into a grayscale image. For each gradient component of the grayscale image, a monochrome image region is created, pixel variation information for the monochrome image region is created and if the pixel variation information satisfies threshold data, the monochrome image region is selected for a mask. Then, a compressed document is created using the mask.

While the method and apparatus for compressing a document using pixel variation information is described herein by way of example for several embodiments and illustrative drawings, those skilled in the art will recognize that the method and apparatus for a document using pixel variation information is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for partial encryption of frame-based electronic content as defined by the appended claims.

Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for a document using pixel variation information are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As explained further below, the present disclosure describes embodiments where a document is compressed according to MRC document compression. Before being transformed into various layers (e.g., a mask, a background layer and a foreground layer), the document is converted into a grayscale image, which is subsequently filtered in order to smooth pixel values. Gradient values are determined for filtered grayscale image. High gradient values may reflect sharp edges around textual data.

Within the mask, values (i.e., color or intensity values) for pixels that correspond with groups of connected pixels (i.e., connected black pixels) within these sharp edges should clearly indicate a presence of the textual data at these locations. Pixel values for pixels within the filtered grayscale image that correspond with these sharp edges are binarized such that only black and white are potential colors. Accordingly, MRC document compression only selects pixels values for the mask from portions of the binarized image having low pixel variation. Such portions includes more connected groups of black pixels, more high gradient value boundary pixels and a higher average boundary pixel gradient value than other portions having high pixel variation.

Figure 1:
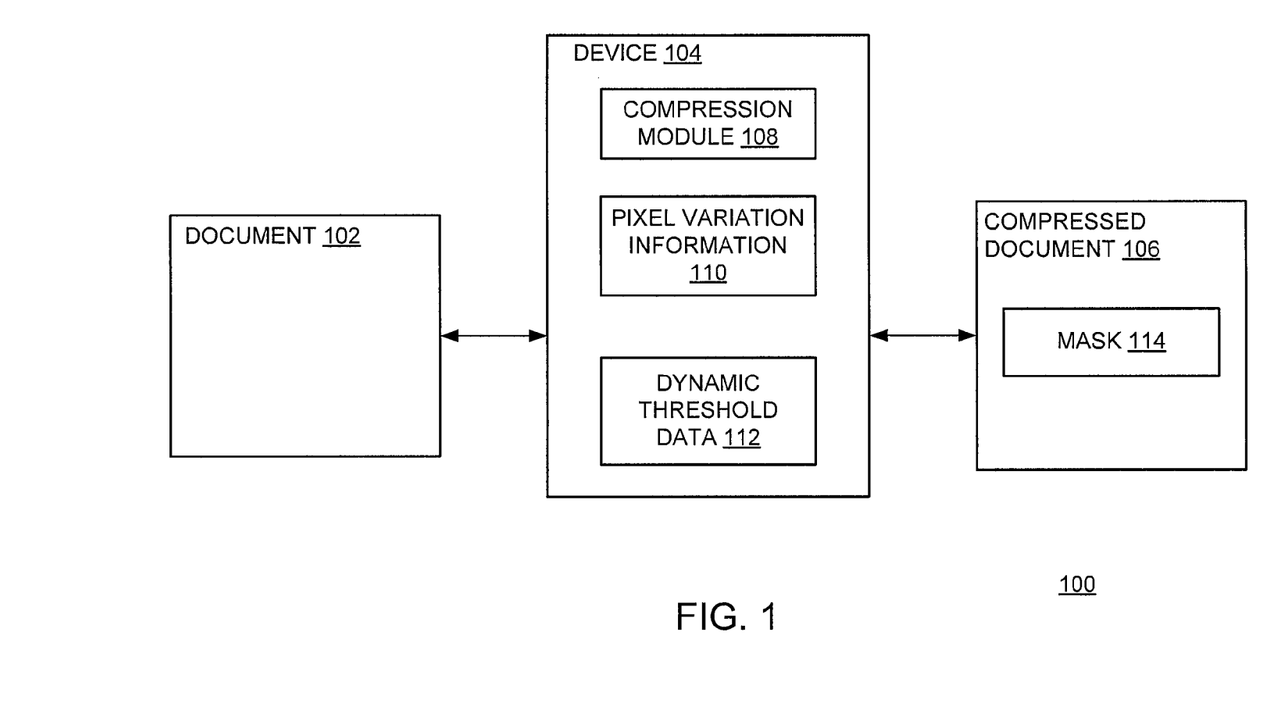
FIG. 1 is a block diagram of a system for compressing a document using pixel variation information according to various embodiments.

FIG. 1 is a block diagram of a system 100 for compressing a document 102 using pixel variation information according to various embodiments. In some embodiments, the system 100 includes a device 104 for executing a compression technique (e.g., MRC) to create the compressed document 106. As explained in the present disclosure, the document 102 may include one or more scanned document images (e.g., grayscale images, color images, text and/or the like) in which pixels collectively represent each page of the document 102.

Exemplary embodiments of the system 100 may be implemented in a computer system that includes desktop computers, laptops, tablet computer, scanners, smart phones, personal digital assistants (PDAs), mobile phones, and the like. One embodiment of the computer system is described in detail with respect to FIG. 5. In some embodiments, the system 100 operates to perform document compression as described with respect to FIG. 2 and execute the methods described with respect to FIGS. 3 and 4. In some embodiments the functionality of some modules, e.g., the compression module described below, may be provided as a hosted service.

The system 100 may function as a means to perform document compression operations in accordance with embodiments of the present disclosure, with various software elements and/or modules given structure in execution using the system 100 and one or more processors therein. The device 104 may be a type of computerized device that executes the various software modules, such as a compression module 108, to effectuate document compression as explained further below.

In some embodiments, the compression module 108 includes processor executable instructions that determine pixel variation information 110 for each component (e.g., a gradient component) associated with the document 102. These components define edges that form textual data and/or image data. After generating a grayscale representation of the document 102, the compression module 108 creates monochrome versions of pixel groups that correspond with the components. These monochrome versions include monochrome image regions whose pixel values (i.e., binary values) are determined using a binarization process.

The pixel variation information 110 reflects an amount of bit changes between adjacent pixels of each of the monochrome versions according to some embodiments. After applying dynamic threshold data 112 (also referred to herein as threshold data) to the pixel variation information 110, the compression module 108 determines which values to use when generating a mask 114. As explained in the present disclosure, the mask 114 includes binary values in which each binary value indicates whether a certain pixel in the compressed document 106 includes a pixel value from a background layer or a foreground layer. In some embodiments, the compression module 108 selects particular ones of the monochrome versions that satisfy thresholds stored in the threshold data 112.

Figure 2:
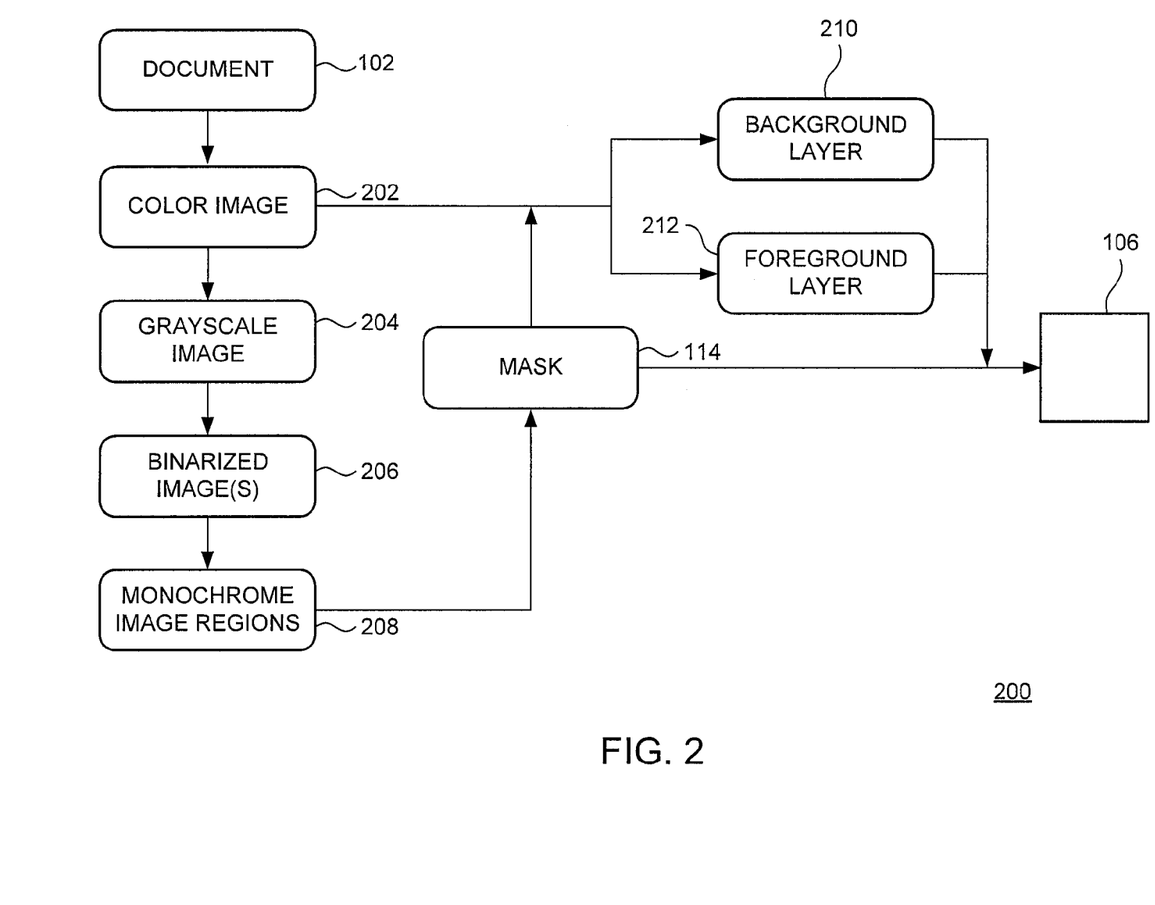
FIG. 2 is a flow diagram illustrating document compression as performed within a system, such as the system described with respect to FIG. 1 according to various embodiments.

FIG. 2 is a flow diagram illustrating document compression 200 according to various embodiments. After converting the document 102 into a color image 202, a grayscale representation is generated based on color pixel values. A filter is applied to the grayscale representation such that pixel values (e.g., intensity values) are smoothened and stored in a grayscale image 204. After producing gradient values for these pixels, a binarization process (e.g., executing a hysteresis binarization filter) is performed to generate binary values based on these gradient values, which are stored in a binarized image 206.

After identifying gradient components within the binarized image 206, monochrome image regions 208 are created from corresponding pixels in the grayscale image 204. In some embodiments, another binarization process is executed on the corresponding pixels within the grayscale image 204 to create the monochrome image regions 208. In other embodiments, the monochrome image regions 208 are portions (e.g., a block of n x n pixels) of the binarized image 206 that include the gradient components. Subsequently, the mask 114 is created by selecting various ones of the monochrome image regions 208 whose pixel variation information (e.g., the pixel variation information 110) satisfy various thresholds (e.g., predefined thresholds stored in the threshold data 112 of FIG. 1). In order to complete the document compression 200, the mask 114 is used to determine which pixels in the color image 202 to store in a background layer 210 and which to store in a foreground layer 212. The mask 114, the background layer 210 and the foreground layer 212 are combined on a pixel by pixel basis to generate the compressed document 106.

Figure 3:
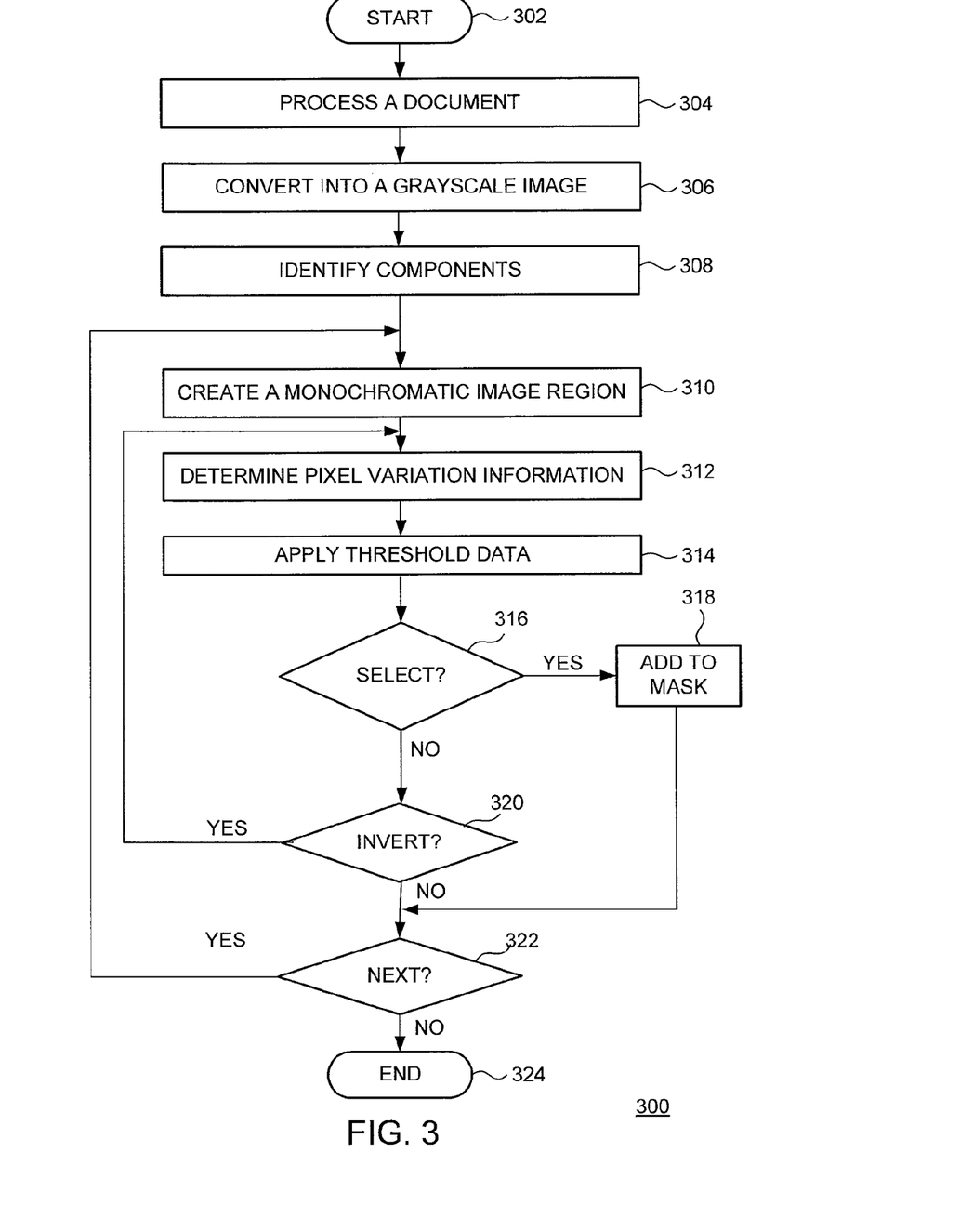
FIG. 3 is a flow diagram of a method of compressing a document using pixel variation information as executed in a computer system implementing the system described with respect to FIG. 1 according to various embodiments.

FIG. 3 is a flow diagram of a method 300 for compressing a document using pixel variation information according to various embodiments. In some embodiments, each and every step of the method 300 is executed by a compression module (e.g., the compression module 108 of FIG. 1) and implemented within a system (e.g., the system 100 of FIG. 1). In other embodiments, one or more steps are skipped or omitted. The method 300 starts at step 302 and proceeds to step 304.

At step 304, the method 300 processes a document (e.g., the document 102 of FIG. 1). In some embodiment, the document 102 is scanned by a scanner device and converted into a twenty-four (24) bit color image (e.g., the color image 202 of FIG. 2). The method 300 runs standard cleaning filters, such as despeckling or background noise removal filters, on the color image. At step 306, the method 300 converts the filtered color image into a grayscale image representing the document 102.

The method 300 may run a simplified Weiner filter on the grayscale image, which creates a sliding window around each pixel in consideration and calculates an average ($\mu$) pixel value and standard deviation ($\zeta$). If the standard deviation is less than a pre-defined threshold, a center pixel is replaced with the average pixel value. If the standard deviation is greater than another threshold, the center pixel is left as is. If the standard deviation is between these two thresholds, then a linear interpolation between original pixel value and the average pixel replaces the center pixel value. Such a filter smooths areas in the grayscale image which are uniform to a human eye while retaining sharp variations in pixel values around text boundaries.

The method 300 runs an edge detection filter, for example, a Sobel filter on the filtered grayscale image to compute gradient values (i.e., magnitudes) and detect edges. A Sobel filter identifies gradients in any direction and suppresses noise caused by local variations. The method 300 may store the gradient values in another grayscale image. The method performs standard hysteresis binarization process on the other grayscale image, which produces a binarized image (e.g., the binarized image 206 of FIG. 2). The standard hysteresis binarization process removes noise while not breaking text boundaries. The method 300 runs a dilation filter, which uses a block (e.g., a five by five pixel block) as a structuring element.

At step 308, the method 300 identifies gradient components associated with the grayscale image. In some embodiments, the method 300 performs a connected component analysis (CCA), which scans the binarized image from left to right and top to bottom. For each black pixel encountered, the method 300 identifies connected black pixels and forms a gradient component. In order to create the compressed document using the gradient components, the method 300 creates a blank mask (e.g., a monochrome image initialized as white) for storing a final mask. For every gradient component, the method 300 repeats steps 312 to 322 in order to create the final mask (e.g., the mask 114 of FIG. 1).

At step 310, the method 300 creates a monochrome image region from a gradient component. In some embodiments, the method 300 computes an average ($\mu$) and standard deviation ($\zeta$) for pixel values from the filtered grayscale image, which have corresponding black pixels contained in the gradient component inside the binarized image. The method 300 subsequently computes two thresholds: T1 and T2. T1 is equal to $\mu+k1*\zeta$ and T2 is equal to $\mu+k2*\zeta$. These thresholds are used to run the hysteresis binarization process on a region of the filtered grayscale image that corresponds with the gradient component. The hysteresis binarization process creates monochrome version of the region (referred to as a monochrome image region). In some embodiments, the method 300 runs single pixel noise removal and/or text boundary smoothening techniques on the monochrome image region.

At step 312, the method 300 determines pixel variation information (e.g., the pixel variation information 110) using the monochrome image region. In some embodiments, the method 300 computes an Average Variation Index (AVI) for the monochrome image region. The AVI may be defined as number of times black and white pixels are flipped while scanning all horizontal and vertical lines divided by twice a size of the monochrome image region. For every boundary pixel, the method 300 determines corresponding gradient values (i.e., magnitudes). The method 300 computes a total number of boundary pixels (Nb) and a total number of boundary pixels (Nbh) that have high gradient values (i.e., gradient values that are large compared to other gradient values at the boundary). Using this data, the method 300 computes a ratio (Nbh/Nb) between the total number of high gradient value boundary pixels and the total number of the boundary pixels. In some embodiments, the method 300 computes an average gradient value for the boundary pixels.

At step 314, the method 300 applies threshold data to the pixel variation information. At step 316, the method 300 determines whether to select the monochrome image region for the mask based on the threshold data. If the monochrome image region satisfies the threshold data, the method 300 proceeds to step 318. In some embodiments, the method 300 determines that the AVI is less than a first threshold, the ratio computed above exceeds a second threshold, and the average gradient value of the boundary pixels exceeds a third threshold. At step 318, the method 300 adds the monochrome image region to the mask at a corresponding location. If, on the other hand, the method 300 determines that the pixel variation information does not satisfy one or more thresholds, the method 300 proceeds to step 322.

At step 320, the method 300 determines whether to invert the monochrome image region. Because the pixel variation information does not satisfy the threshold data, the monochrome image region may include reverse text (e.g., light text on a dark background instead of dark text on a light background). Accordingly, the method 300 inverts the monochrome region and returns to step 312. Hence, if the inverted monochrome region satisfies the threshold data, the method 300 proceeds to step 318 and adds the inverted monochrome region to the mask. If, on the other hand, the monochrome image region does not satisfy the threshold data, the method 300 proceeds to step 322. Alternatively, the method 300 returns to step 312 after creating a monochrome image region using all the pixels, which are enclosed within the gradient component in the binarized image. Such an alternative embodiment may be employed for large text.

At step 322, the method 300 determines whether there is a next gradient component to analyze. If there is a next gradient component, the method 300 returns to step 310. If there are no more gradient components, the method 300 proceeds to step 324. At step 324, the method 300 ends.

Figure 4:
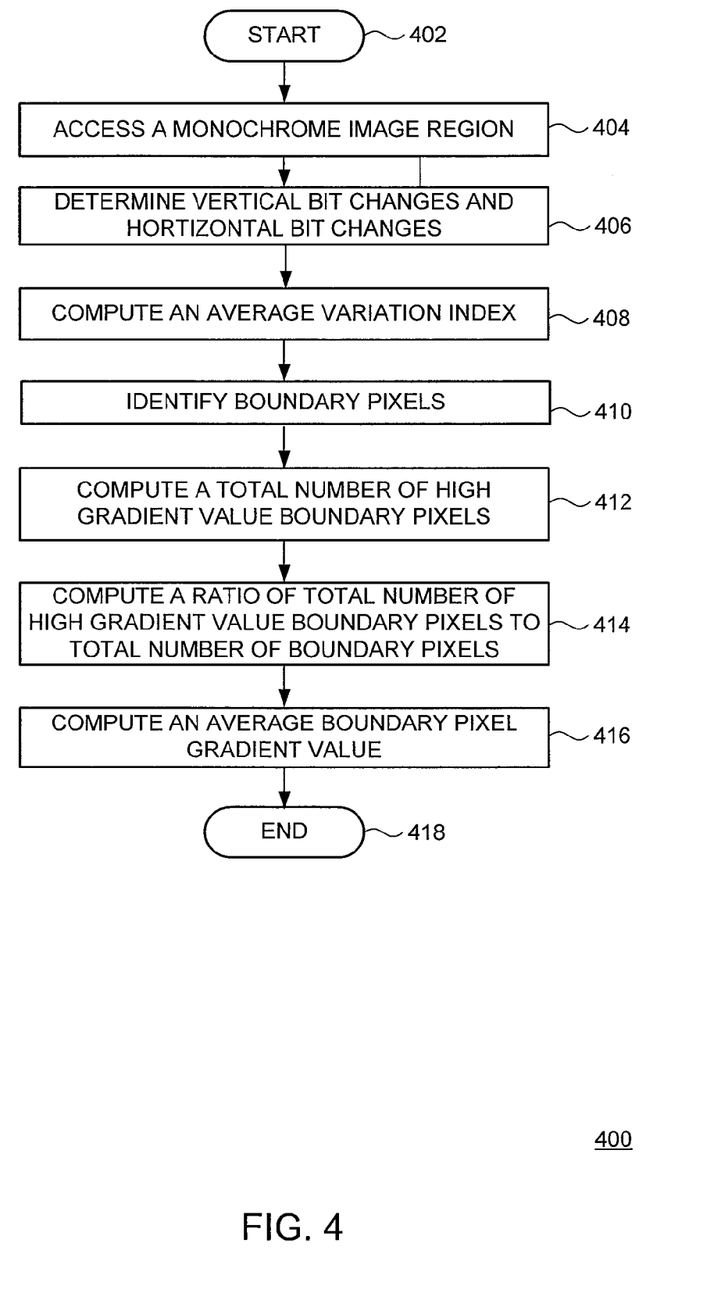
FIG. 4 is a flow diagram of a method of determining pixel variation information to generate a mask for compressing a document as executed in a computer system implementing the system described with respect to FIG. 1 according to various embodiments.

FIG. 4 is a flow diagram of a method 400 of determining pixel variation information to generate a mask for compressing a document according to various embodiments. In some embodiments, each and every step of the method 400 is executed by a compression module (e.g., the compression module 108 of FIG. 1) and implemented within a system (e.g., the system 100 of FIG. 1). In other embodiments, one or more steps are skipped or omitted. The method 400 starts at step 402 and proceeds to step 404. At step 404, the method 400 accesses a monochrome image region.

At step 406, the method 400 determines a number of vertical bit changes and a number of horizontal bit changes during a scan of the monochrome image region. At step 408, the method 400 determines an average variation index based on the number of vertical bit changes, the number of horizontal bit changes and a size of the monochrome image region. In some embodiments, the method 400 computes a sum of the number of vertical bit changes and the number of horizontal bit changes and divides the sum by twice the size of the monochrome image region. At step 410, the method 400 identifies boundary pixels, which are neighboring pixels that differ in color (i.e., an opposite color). The boundary pixels may form edges for textual data. The method 400 also computes a total number of the boundary pixels.

At step 412, the method 400 compares corresponding gradient values for the boundary pixels to a pre-defined threshold and computes a total number of high gradient value boundary pixels. At step 414, the method 400 computes a ratio of the total number of the high gradient value boundary pixels to the total number of the boundary pixels. At step 416, the method 400 computes an average gradient value for the boundary pixels. At step 418, the method 400 ends.

Example Computer System

Various embodiments of a method and apparatus for compressing a document using pixel variation information, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement the system 100 described above. While the illustrated system demonstrates computer system 500 implementing the system 100, computer system 500 may be used to implement any other system, device, element, functionality or method of the above-described embodiments. In the illustrated embodiments, computer system 500 may be configured to implement the compression module 108 as processor-executable executable program instructions 522 (e.g., program instructions executable by processor(s) 510a-n ) in various embodiments.

Figure 5:
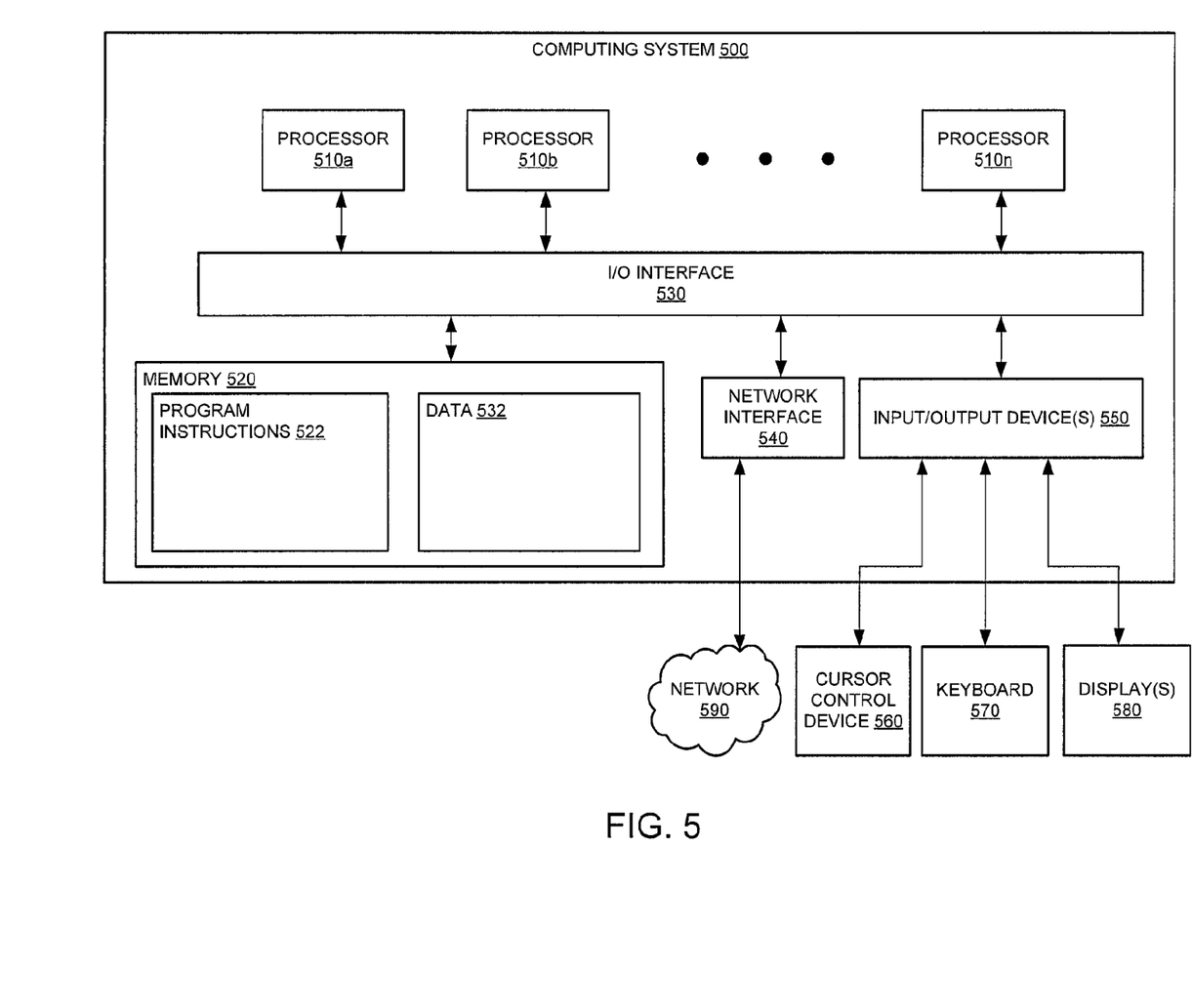
FIG. 5 is a schematic diagram of a computing system that can be used to implement a system for compressing a document using pixel variation information, such as the system described with respect to FIG. 1, perform document compression as described with respect to FIG. 2 and execute the methods described with respect to FIGS. 3-4 according to various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of these components may be utilized by the computer system 500 to receive user input as described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 532 and/or data 532 accessible by processor 510a-n. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions 522, such as the compression module 108, and data 532, such as the pixel variation information 110 or the threshold data 112, implementing any of the elements of the embodiments described above may be stored within system memory 520. In other embodiments, program instructions 522 and/or data 532 may be received, sent or stored upon different types of computer- accessible media or on similar media separate from system memory 520 or computer system 500.

In one embodiment, I/O interface 530 may be configured to coordinate I/O traffic between processors 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510a-n). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510a-n.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 3-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for providing document compression, comprising:
    converting, using a processor, a document into a grayscale image;
    forming a plurality of gradient components from connected black pixels of a generated binarized image that represents the grayscale image;
    for each gradient component in the plurality of gradient components of the grayscale image:
        creating, using a processor, a monochrome image region, wherein creating comprises performing a binarization process on a region of the grayscale image that corresponds to the gradient component,
        determining, using a processor, pixel variation information for the monochrome image region, wherein determining the pixel variation information further comprises computing an average variation index based on a number of vertical bit flips, a number of horizontal bit flips and a size of the monochrome image region, and
        selecting, using a processor, the monochrome image region for a mask if the pixel variation information satisfies threshold data; and
    creating, using a processor, a compressed document using the mask.

2. The method of claim 1, wherein converting the document further comprises filtering the grayscale image.

3. The method of claim 1, wherein determining the pixel variation information further comprises determining a number of high gradient value boundary pixels.

4. The method of claim 1, wherein determining the pixel variation information further comprises determining a ratio of high gradient value boundary pixels to a total number of pixels.

5. The method of claim 1, wherein determining the pixel variation information further comprises determining an average value for high gradient value boundary pixels.

6. The method of claim 1, wherein creating the monochrome image region further comprises inverting the monochrome image region.

7. An apparatus for providing document compression, comprising:
 a compression module for converting a document into a grayscale image, for each gradient component of the grayscale image: creating a monochrome image region, determining pixel variation information for the monochrome image region, wherein the pixel variation information comprises an average variation index based on a number of vertical bit flips, a number of horizontal bit flips and a size of the monochrome image region, selecting the monochrome image region for a mask if the pixel variation information satisfies threshold data and for creating a compressed document using the mask.

8. The apparatus of claim 7, wherein the compression module filters the grayscale image.

9. The apparatus of claim 7, wherein the compression module determines a number of high gradient value boundary pixels.

10. The apparatus of claim 7, wherein the compression module determines a ratio of high gradient value boundary pixels to a total number of pixels.

11. The apparatus of claim 7, wherein the compression module determines an average value for high gradient value boundary pixels.

12. The apparatus of claim 7, wherein the compression module inverts the monochrome image region.

13. A computer readable medium for storing processor executable instructions that, when executed by a computing system, causes the computing system to perform a method comprising:
 converting a document into a grayscale image;
 forming a plurality of gradient components from connected black pixels of a generated binarized image that represents the grayscale image;
 for each gradient component of the grayscale image:
  creating a monochrome image region, wherein creating comprises performing a binarization process on a region of the grayscale image that corresponds to the gradient component,
  determining pixel variation information for the monochrome image region,
 wherein determining the pixel variation information further comprises computing an average variation index based on a number of vertical bit changes, a number of horizontal bit changes and a size of the monochrome image region, and
  selecting the monochrome image region for a mask if the pixel variation information satisfies dynamic threshold data; and
 creating a compressed document using the mask.

14. The computer readable medium of claim 13, wherein the method further comprising:
 filtering the grayscale image.

15. The computer readable medium of claim 13, wherein the method further comprising:
 inverting the monochrome image region.

* * * * *